J. S. ANDERSON.
Railway-Car Brakes.

No. 139,527.  Patented June 3, 1873.

WITNESSES.  INVENTOR.
E. P. Bates.  John S. Anderson,
Chas. B. Stock.  Chipman Hosmer & Co,
  Attorneys.

UNITED STATES PATENT OFFICE.

JOHN S. ANDERSON, OF FLINTVILLE, WISCONSIN.

IMPROVEMENT IN RAILWAY CAR-BRAKES.

Specification forming part of Letters Patent No. 139,527, dated June 3, 1873; application filed January 25, 1873.

*To all whom it may concern:*

Be it known that I, JOHN S. ANDERSON, of Flintville, in the county of Brown and State of Wisconsin, have invented a new and valuable Improvement in Car-Brakes; and I do hereby declare that the following is a full, clear, and exact description of the construction and operation of the same, reference being had to the annexed drawing making a part of this specification, and to the letters and figures of reference marked thereon.

Figure 1:
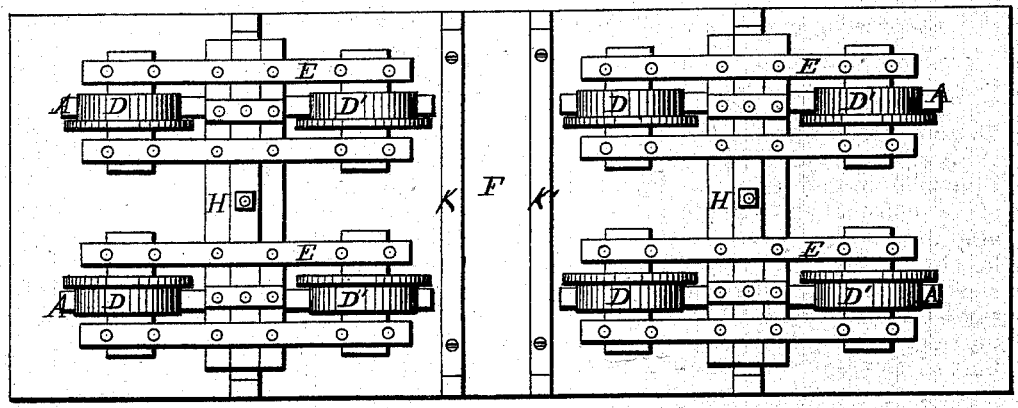
Figure 2:
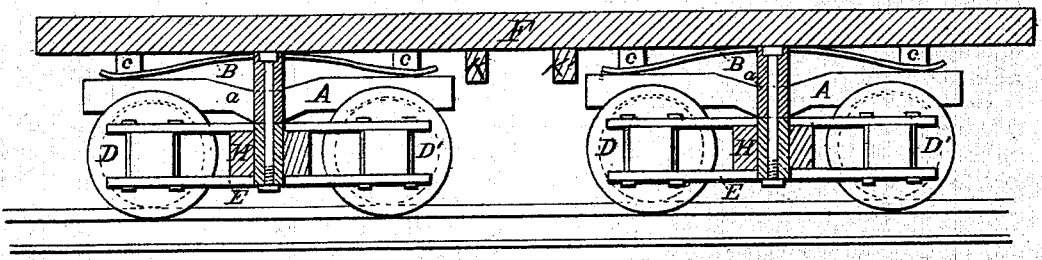

Figure 1 of the drawing is a representation of a bottom view of my invention. Fig. 2 is a sectional view of the same.

The object of this invention is to prevent the car to which it is applied from running off the track, which almost invariably happens while the train is going around a curve, and results from the tendency of the outside wheels to ride up over the rails, in consequence of the centrifugal force, which throws the weight of the train against the outside rail and brings the flange of the wheel in forcible contact with the upper inside edge of the rail in such a manner as to cause the wheel to act as a lever and raise the wheel and its load over the track.

The nature of my invention consists in the construction and novel arrangement of the parts constituting a car-brake, designed to be operated in an automatic manner, as hereinafter more fully described.

In the accompanying drawing—

A represents a bar which operates as the rubber or shoe of my improved automatic brake. It is bolted to the truck at *a*, so that the ends are immediately over the faces of the two wheels D D'. Bolted to the under side of the floor of the car, immediately over the bar A, is a flat metallic spring, B, whose ends are curved downward so as to rest upon the upper side of the bar, over the wheels. India-rubber springs C C are placed between the floor F and the curved ends of the springs B to secure the proper degree of stiffness. All the wheels revolve independently of each other, the two wheels D D' on each side being journaled in a frame, E, running longitudinally of the car, and attached to a frame, H, which runs transversely of the car, and is pivoted to the floor in the usual manner of securing trucks. K K' are transverse bars secured to the under side of the floor, and arranged, respectively, in front and in rear of the truck-frames H, serving the purpose of stops to prevent the trucks from turning too far.

By thus arranging the wheels separately and independently of each other, instead of having each pair attached to one axle, I gain the advantages which have been heretofore attributed to such an arrangement, and at the same time accomplish the object of this invention, as follows: The bars A being located over the wheels without touching them, the wheels revolve freely so long as they remain properly on the track; but as the space between the bar and the face of the wheel is much less than the width of the flange of the wheel, as soon as the wheel D begins to ride up or climb the track its further revolution is prevented by its contact with the bar, while the other wheels of the same truck continue their revolutions without restriction. As soon as the wheel D ceases its revolution it loses its power as a lever and its tendency to raise itself and load over the track and the weight of the car forces the wheel back into place upon the rail.

What I claim as my invention, and desire to secure by Letters Patent, is—

In an automatic car-brake, the combination of the independent wheels D D' journaled to the frame E, the pivoted truck-frame H, the transverse bars K K', the brake-bar A, and the flat spring B, all constructed and arranged as described and operating in the manner set forth.

In testimony that I claim the above I have hereunto subscribed my name in the presence of two witnesses.

JOHN S. ANDERSON.

Witnesses:
 B. W. RICHARDSON,
 L. R. LAMB, Sr.